(12) United States Patent
Malpani et al.

(10) Patent No.: US 9,165,130 B2
(45) Date of Patent: Oct. 20, 2015

(54) MAPPING BIOMETRICS TO A UNIQUE KEY

(71) Applicant: CA, Inc., Islandia, NY (US)

(72) Inventors: Ambarish Malpani, Palo Alto, CA (US); Rammohan Varadarajan, Cupertino, CA (US)

(73) Assignee: CA, Inc., New York, NY (US)

( * ) Notice: Subject to any disclaimer, the term of this patent is extended or adjusted under 35 U.S.C. 154(b) by 143 days.

(21) Appl. No.: 13/682,917

(22) Filed: Nov. 21, 2012

(65) Prior Publication Data

US 2014/0139318 A1    May 22, 2014

(51) Int. Cl.
| | | |
|---|---|---|
| G05B 19/00 | (2006.01) | |
| G06F 7/00 | (2006.01) | |
| G08B 29/00 | (2006.01) | |
| H04B 1/00 | (2006.01) | |
| G06F 21/32 | (2013.01) | |

(52) U.S. Cl.
CPC ..................................... G06F 21/32 (2013.01)

(58) Field of Classification Search
CPC ...................................................... G05B 19/00
USPC ................ 340/5.82, 5.52; 713/193, 185, 186; 705/71; 382/124; 726/19
See application file for complete search history.

(56) References Cited

U.S. PATENT DOCUMENTS

| | | | |
|---|---|---|---|
| 6,170,058 B1 | 1/2001 | Kausik | |
| 6,310,966 B1 | 10/2001 | Dulude et al. | |
| 6,498,861 B1 * | 12/2002 | Hamid et al. | 382/124 |
| 7,107,220 B2 | 9/2006 | Novack et al. | |
| 7,278,028 B1 * | 10/2007 | Hingoranee | 713/186 |
| 7,298,873 B2 | 11/2007 | Miller, Jr. et al. | |
| 7,302,583 B2 | 11/2007 | Forrest | |
| 7,359,532 B2 | 4/2008 | Acharya et al. | |
| 7,426,750 B2 * | 9/2008 | Cooper et al. | 726/26 |
| 7,486,810 B1 * | 2/2009 | Accapadi | 382/124 |
| 7,493,486 B1 * | 2/2009 | Jacobs et al. | 713/153 |
| 7,529,944 B2 * | 5/2009 | Hamid | 713/186 |
| 7,676,068 B2 | 3/2010 | Cervantes | |

(Continued)

FOREIGN PATENT DOCUMENTS

| | | |
|---|---|---|
| EP | 2187338 A1 | 5/2010 |
| WO | WO 02/095552 A2 | 11/2002 |

OTHER PUBLICATIONS

Ballard, Lucas, et al., "Towards Practical Biometric Key Generation with Randomized Biometric Templates," CCS'08, Oct. 27-31, 2008, 10 pages.

(Continued)

*Primary Examiner* — Nam V Nguyen
(74) *Attorney, Agent, or Firm* — Vierra Magen Marcus LLP (57) ABSTRACT

A technique for mapping a biometric credential of a user to a data value such as a key or password. A database stores multiple entries of biometric templates and associated data values for different users. One of the entries is a match for a particular user, and the remaining entries are randomly selected. The number of entries is reasonably large to provide a desired degree of randomness for a given entry, but smaller than a key space of the data values. Based on an input of a biometric sample of the user, a best match is selected from the entries of biometric templates, and the associated data value is used to authenticate the user. Two- or three-factor authentication can be provided. Additional factors can include a password provided by the user and a key which is encrypted by the data value of the matching entry.

20 Claims, 6 Drawing Sheets

(56) References Cited

U.S. PATENT DOCUMENTS

| | | | |
|---|---|---|---|
| 7,725,733 | B2 | 5/2010 | Higashiura et al. |
| 7,844,827 | B1 | 11/2010 | Itoi |
| 8,031,981 | B2 * | 10/2011 | Peirce ..................... 382/305 |
| 8,218,828 | B2 | 7/2012 | Iasso |
| 8,458,484 | B2 * | 6/2013 | Burke et al. ............. 713/184 |
| 8,554,021 | B2 * | 10/2013 | Kletter ..................... 382/306 |
| 2001/0034837 | A1 | 10/2001 | Kausik et al. |
| 2004/0193893 | A1 * | 9/2004 | Braithwaite et al. ........ 713/186 |
| 2005/0154896 | A1 * | 7/2005 | Widman et al. ............. 713/182 |
| 2007/0226512 | A1 | 9/2007 | Kevenaar et al. |
| 2008/0212846 | A1 | 9/2008 | Yamamoto et al. |
| 2010/0142764 | A1 | 6/2010 | Ikegami |
| 2010/0205431 | A1 * | 8/2010 | Griffin ..................... 713/158 |
| 2011/0060913 | A1 | 3/2011 | Hird et al. |
| 2011/0276495 | A1 | 11/2011 | Varadarajan et al. |
| 2012/0174214 | A1 * | 7/2012 | Huang et al. ............. 726/19 |

OTHER PUBLICATIONS

CA, Technologies, "CA ArcotID, Technology Brief," Mar. 25, 2011, 21 pages.

Sedgwick, Nigel, "Iris Pattern Matching using Score Normalisation Techniques," ICE: Iris Evaluation Challenge, Mar. 23, 2006, 26 pages.

Matyas, Vaclav, et al., "Biometric Authentication—Security and Usability," Proc. of IFIP TC6/TC11 Sixth Joint Working Conference on Communications and Multimedia Security: Advanced Communications and Multimedia Security, Portoroz, 2002, 13 pages.

Derawi, Mohammad O., et al., "Fingerprint Recognition with Embedded Cameras on Mobile Phones," Norwegian Information Security Laboratory, Gjvik University College, Norway, Mar. 30, 2011, 12 pages.

Hao, Feng, et al., "Combining cryptography with biometrics effectively," Technical Reports, University of Cambridge Computer Laboratory, Jul. 2005, 17 pages.

Hoover, D.N., et al., "Software Smart Cards vis Cryptographic Camouflage," Proceedings of the 1999 IEEE Symposium on Security and Privacy, May 1999, 8 pages.

"Using biometrics to securely check virtual identities," ICT Results, May 27, 2004, 2 pages.

Jain, Anil, et al., "Introduction to Biometrics," Biometrics: Personal Identification in Networked Society, Jan. 15, 1999, 43 pages.

Jain, Anil, et al., "An Introduction to Biometric Recognition," IEEE Transactions on Circuits and Systems for Video Technologies, vol. 14, No. 1, Jan. 2004, 66 pages.

"Minutia vs. Pattern Based Fingerprint Templates," Identix—Empowering Identification, Mar. 26, 2003, 8 pages.

Blanton, Marina, et al., "Secure Computation of Biometric Matching," Department of Computer Science and Engineering, University of Notre Dame, Apr. 22, 2009, 22 pages.

* cited by examiner

MAPPING BIOMETRICS TO A UNIQUE KEY

BACKGROUND

Biometric credentials are commonly uses to control access to a computing resource such as a file, a web page or a database, or other type of resource. Examples of biometrics include: face geometry, fingerprint, palm print, hand and finger geometry, key stroke dynamics, hand vein pattern, iris visual texture, retinal scan pattern, signature, voice print, infrared facial and hand vein thermograms, odor, DNA, gait and ear shape. Biometrics can be used to authenticate a person who attempts to access a computing resource by answering the question: Am I who I claim I am? A biometric represents "something a person is," and can be used to authenticate a person's identity together with "something the person possesses" (e.g., a computing device, ATM card, smart card, key fob with password) or "something the person knows" (e.g., a memorized password or personal identification number (PIN)).

BRIEF SUMMARY

Techniques are provided for reliably mapping a biometric credential of a user to a unique data value such as a key or password. In one approach, a database of biometric templates and associated data values are provided for a user. One of the biometric templates is associated with the user, while the other biometric templates are present to provide a desired degree of randomness for the biometric template and the associated data value of the user. In an example initialization process, multiple users provide initial biometric samples and these are used to populate a generic (non-user specific) database. A user-specific database is subsequently provided, such as from a subset of entries of the generic database, and made available to a computing device of a user. The user provides a subsequent biometric sample which is compared to the biometric templates in the database to determine a best match. The associated data value of the best match is used to authenticate the user. The data value can be one factor in a multi-factor authentication process. The data value could be used for encrypting or decrypting data.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or by combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
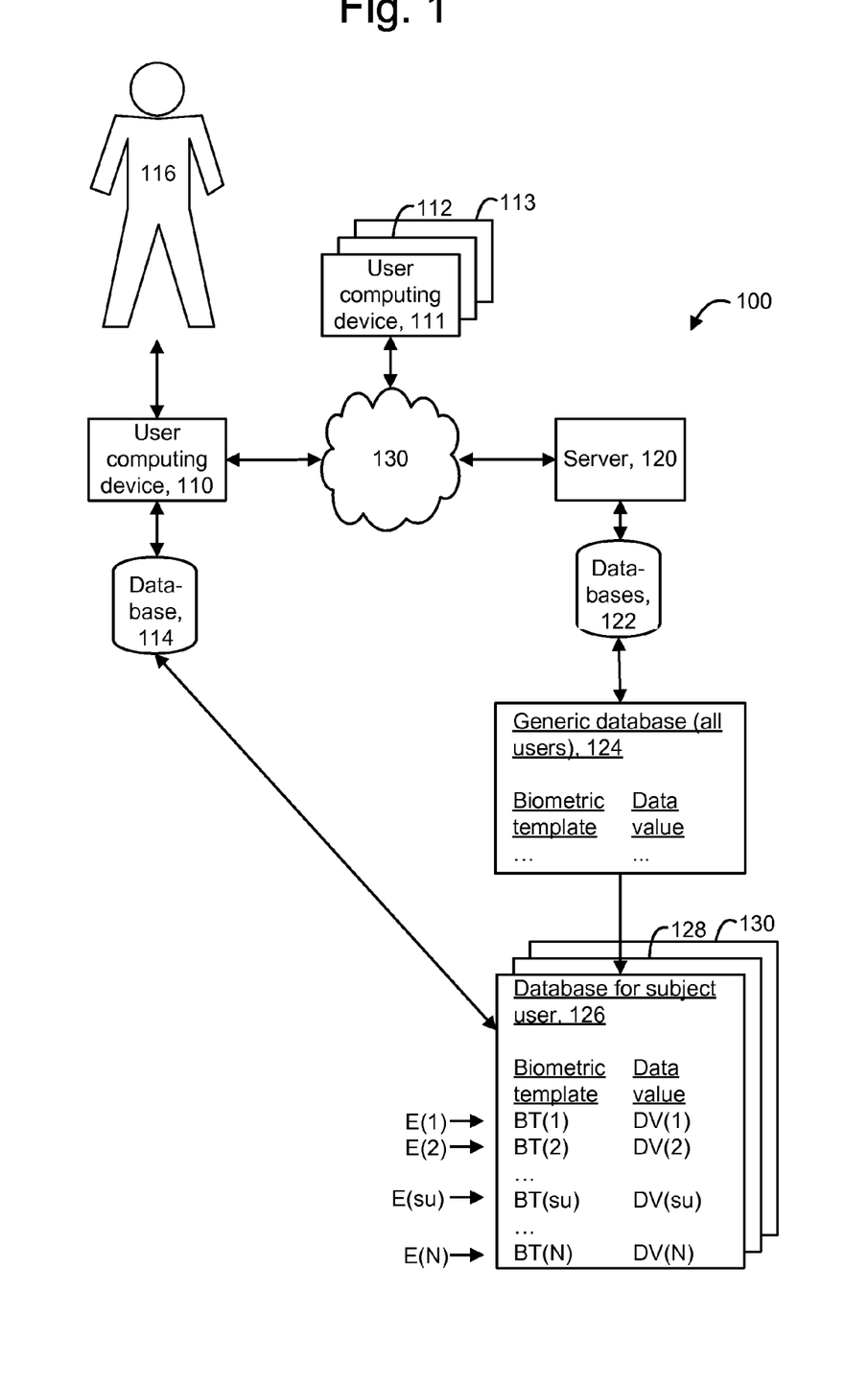
FIG. 1 depicts an example network 100 in which a user is authenticated at a computing device.

FIG. 1 depicts an example network 100 in which a user is authenticated at a computing device. The network includes a network communication medium or cloud 130, a server 120, a user computing device 110 which is operated by a subject user 116 and other computing devices 111, 112 and 113 which are associated with other respective users. The user computing devices can be laptops, tablets, personal computers (PCs), workstations, cell phones, other mobile phones, portable media players, personal digital assistants (PDAs) or other computing devices which are operated by an end user. A computing device could also be an electronic access component for a physical lock, such as an electronic key pad of a door lock. In some cases, the user computing device is a client of the server 120. The user provides a biometric input to the user computing device 110 as discussed further below.

The server 120 can provide one or more databases 122, such as a generic (non-user specific) database 124 with entries which each include a biometric template and an associated data value. The biometric templates and the associated data values can be unique within the database. Further, in one approach, one or more user-specific databases 126, 128 and 130 are provided as subsets of the generic database. Each user-specific database is deployed for a specific user and includes entries which each include a biometric template and an associated data value. For example, there can be a number N>1 entries denoted by E(1), E(2), . . . , E(su), . . . , E(N). E(su) represents an entry for a subject user. Entry E(1) has a biometric template denoted by BT(1) and an associated data value denoted by DV(1). Similarly, E(2) has a biometric template BT(2) and an associated data value DV(2), E(su) has a biometric template BT(su) and an associated data value DV(su) and E(N) has a biometric template BT(N) and an associated data value DV(N).

The generic database can have a number M>1 entries, where M>N. A user-specific database can include adjacent or non-adjacent entries from the generic database. The entry for the subject user can be randomly positioned within the user-specific database. The entries for the users other than the subject user can be randomly or otherwise selected from the generic database. For example, the entries in the user-specific database 126 can be consecutive entries from the generic database.

A database for a subject user can be deployed at the server or at the user's computing device. For example, the database 114 can represent the database for the subject user 126. The database can be stored at the user's computing device so that a biometric sample of the user is not transmitted outside the computing device during the authenticating of the user.

In another approach, the database 114 represents the generic database 124 and no user-specific database is provided. The users associated with the other user computing devices 111, 112 and 113 can similarly receive user-specific databases or the generic database. In one approach, each entry of the generic database also includes an identifier of the associated user but the identifier is not included in the user-specific database 126 to avoid possible disclosure of the user identifier and a link between the user identifier and a particular biometric template. Instead, when the database 126 is provided at the user computing device 110, an attacker can only learn that the database contains many entries of biometric templates, but they are not associated with specific users. Even if the attacker knows the identity of the user of the computing device, the number of entries of biometric templates can be large enough, e.g., many thousands, so that it is not possible to associate the user with one of the biometric templates.

Figure 2A:
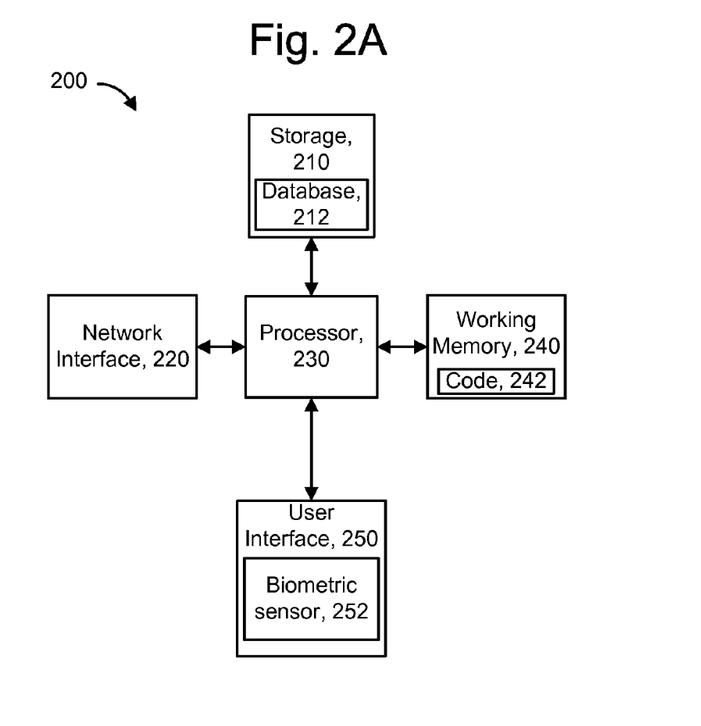
FIG. 2A depicts an example computing device of the network of FIG. 1.

FIG. 2A depicts a computing device of the network of FIG. 1. The computing device 200 is a simplified representation of a system which can represent any of the user computing devices or the server of FIG. 1. The computing device 200 includes a storage device 210 such as a hard disk or portable media, a network interface 220 for communicating with other computing devices, a processor 230 for executing code (e.g., software instructions/modules), a working memory 240 such as RAM for storing the code 242 after it is loaded from the storage device 210, for instance, and a user interface 250. The storage device 210 or working memory 240 may be considered to be a tangible, non-transitory processor- or computer-readable storage device having processor readable code embodied thereon for programming the processor 230 to perform methods for providing the functionality discussed herein.

A database 212 in the storage device 210 may represent any of the databases 124, 126, 128 and 130 of FIG. 1, for instance.

The user interface 250 can include a display to provide information to a human user, and an input device such as a keyboard or mouse for receiving inputs/commands from a human user. The user interface can also include a biometric sensor 252 which receives a biometric sample from a user. Various types of biometrics can be used based on the type of biometric which is being sensed. For example, a fingerprint sensor in the form of a touch pad can be built into a computing device or connected as a peripheral. Other example approaches use the webcam of a laptop or personal computer or the camera of a cell phone to obtain an image of a fingerprint.

Figure 2B:
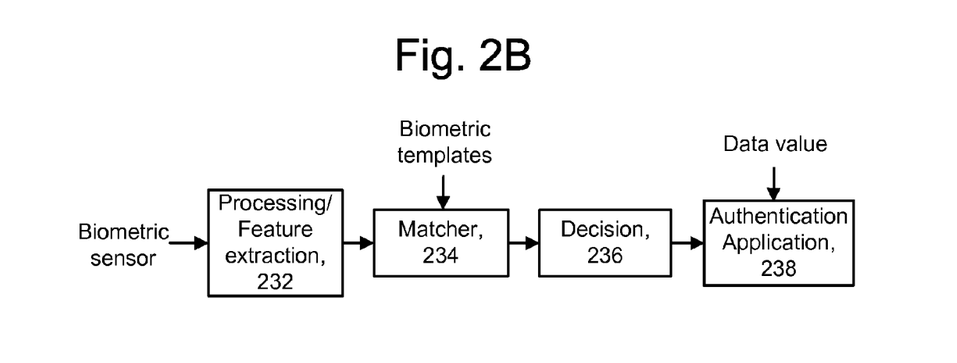
FIG. 2B depicts example software modules which can be executed by the processor 230 of FIG. 2A in a client-side process.

FIG. 2B depicts example software modules which can be executed by the processor 230 of FIG. 2A in a client-side process. The software modules can include a processing/feature extraction module 232 which receives a biometric sample of a user from the biometric sensor 252. For instance, the biometric sample can be a high resolution fingerprint image. In one approach, in the case of a fingerprint, the processing/feature extraction module 232 locates a center of the fingerprint image and crops the image a fixed distance around this graphical center. In another approach, also in the case of a fingerprint, the processing/feature extraction module 232 extracts features of the biometric sample by determining the location of the core, the pattern type (e.g. right loop, left arch, etc.), estimates the quality of the ridge lines, and extracts minutia (e.g., points in which the ridges split, intersect or end). A matcher module 234 compares the output of the processing/feature extraction module 232 to biometric templates in the database 212.

In the case where an image of a fingerprint is used for matching, the biometric templates are also images of fingerprints. Pattern-based templates can be used to make a graphical comparison of the fingerprint image provided by the processing/feature extraction module 232 and fingerprint images of the biometric templates, and determine a measure of the differences. The greater the difference between a sample fingerprint image and a fingerprint image of a biometric template, the less likely it is that the fingerprints match. The difference, or conversely, the degree of matching or similarity, can be expressed by a score for each biometric template, and the score provided to a decision module 236 which ranks the scores and determines the biometric template with the best score (closest match). For example, U.S. Pat. No. 7,359,532, titled "Fingerprint minutiae matching using scoring techniques," incorporated herein by reference, discusses various scoring techniques.

In the case where the extracted minutia of a fingerprint is used for matching, pattern based algorithms can be used to compare the basic fingerprint patterns (e.g., arch, whorl, and loop) between the sample and the biometric templates. In a pattern-based algorithm, the template contains the type, size, and orientation of patterns within a fingerprint image. The sample is graphically compared to each of the biometric templates to determine the degree to which they match. The degree of matching can be expressed by a score for each biometric template, and the score provided to the decision module 236.

Both image and minutia matching can be used as well, in which case each template can include image and minutia data. A template can be considered to include multiple templates of different types. In another approach, multiple types of biometrics are analyzed by the matcher module 234. For example, a matching score can be obtained for each type of biometric and the type of biometric with the highest matching score used to identify the best match. Or, an average of the matching scores for the different types of biometrics can be used to identify the best match. The best match indicates the biometric template or set of biometric templates associated with a user.

A biometric sample or data is meant to encompass a biometric input of a user to a sensor regardless of processing of the input. For example, the biometric sample or data can encompass an image of a fingerprint and/or extracted minutia of a fingerprint.

For biometrics other than fingerprints, appropriate functionality can be provided for the processing/feature extraction module 232 and matcher module 234.

The decision module 236 informs an authentication application of the best match biometric template in the database, such as by an entry identifier E(1), E(2) . . . . In response, the authentication application 238 obtains the data value associated with the entry from the database. The authentication application 238 can perform various actions to authenticate the user as discussed below based on the data value and optionally, other user inputs. For instance, the authentication application 238 can authenticate the user to a banking web site where the user conducts financial transactions. Example modules of the authentication application 238 are provided in FIGS. 5 and 6.

In one possible implementation, the software modules 232, 234, 236 and 238 run at the user's computing device. In another possible implementation, the software modules 232 and 238 run at the user's computing device while the modules 234 and 236 run at a server.

The functionality described herein may be implemented using hardware, software or a combination of both hardware and software. For software, one or more non-transitory, tangible processor readable storage devices having processor readable code embodied thereon for programming one or more processors may be used. The non-transitory, tangible processor readable storage devices can include computer readable media such as volatile and nonvolatile media, removable and non-removable media.

Figure 2C:
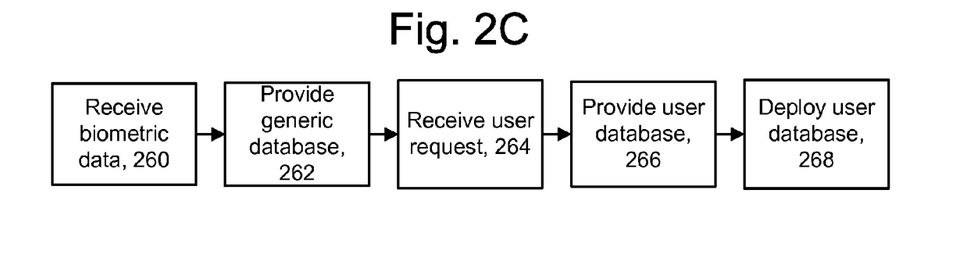
FIG. 2C depicts example software modules which can be executed by the processor 230 of FIG. 2A in a server-side process.

FIG. 2C depicts example software modules which can be executed by the processor 230 of FIG. 2A in a server-side process. A computer program product for use at the server side can generally include computer readable storage medium having computer readable program code embodied therewith. The computer readable program code can include computer readable program code (260) configured to receive biometric data from computing devices of a plurality of users. Computer readable program code (262) is configured to provide a database with entries for each of the plurality of users, where each entry comprises the biometric data and an associated data value of the user. Computer readable program code (264) is configured to receive a request from one of the computing devices, where the one of the computing devices is associated with a subject user. Computer readable program code (266) is configured to, in response to the request, select a proper subset of the entries comprising an entry of biometric data and associated data value for the subject user, and entries of biometric data and associated data values for other users of the plurality of users, and to provide a database for the one of the computing devices of the subject user comprising the proper subset of the entries. Computer readable program code (268) is configured to deploy the database for the computing device of the subject user on the computing device of the subject user.

Figures 3A, 3B, 3C, 3D, 3E:
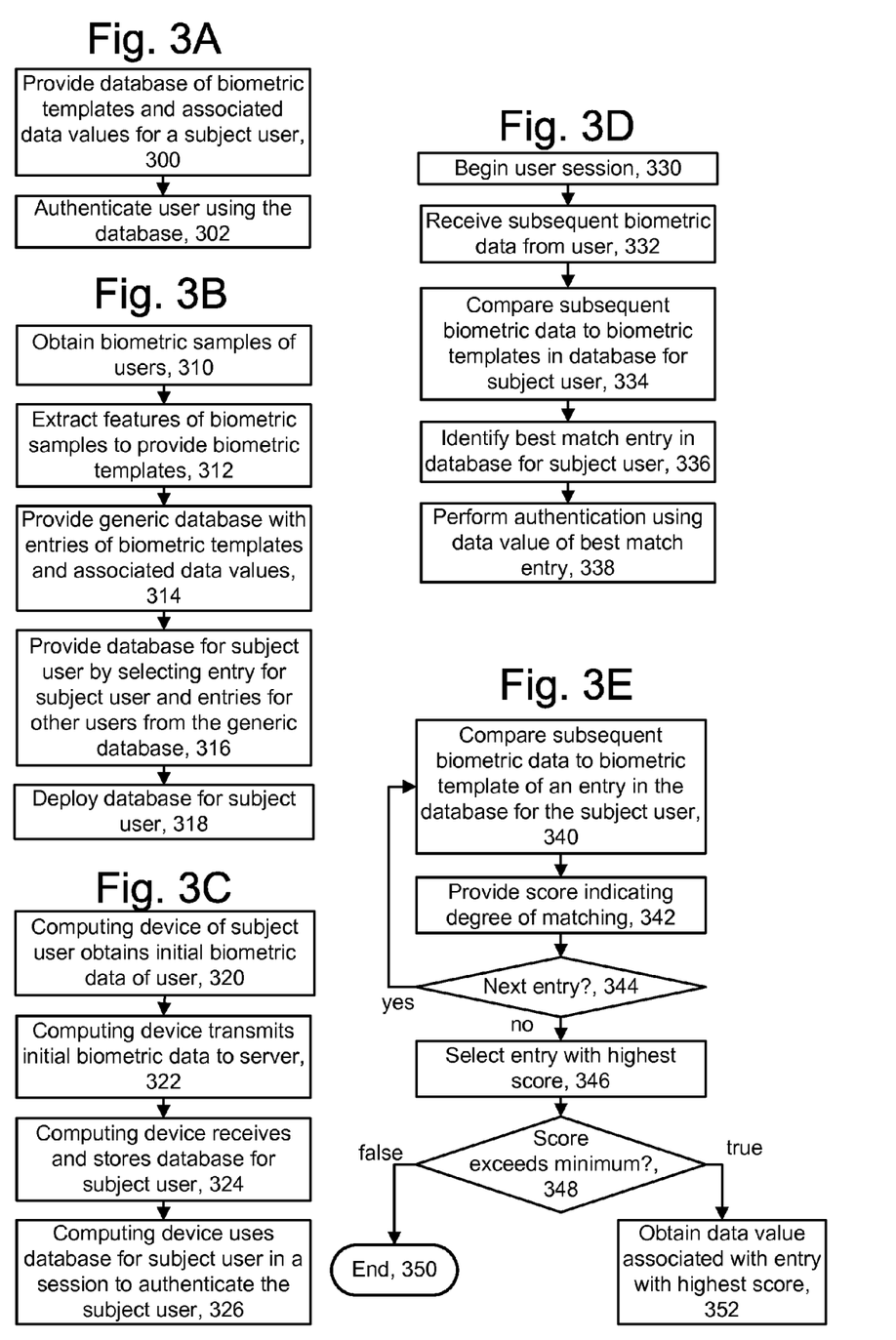
FIG. 3A depicts an example process for authenticating a user.
FIG. 3B depicts an example server-side perspective of the authenticating process of FIG. 3A.
FIG. 3C depicts an example client-side perspective of the authenticating process of FIG. 3A.
FIG. 3D depicts an example process for using a database for a subject user in a session to authenticate the subject user in accordance with step 326 of FIG. 3C.
FIG. 3E depicts an example process for identifying a best match entry in a database for a subject user in accordance with step 336 of FIG. 3D.

FIG. 3A depicts an example process for authenticating a user. Step 300 provides a database of biometric templates and associated data values for a subject user, such as the databases depicted in FIGS. 1 and 2A. Step 302 authenticates a user using the database. Further details of the process from a server-side perspective and from a client-side perspective are provided, e.g., in connection with FIGS. 3B and 3C, respectively.

FIG. 3B depicts an example server-side perspective of the authenticating process of FIG. 3A. Step 310 obtains biometric samples of users. The samples can be obtained over time as users enroll their biometric samples using the authentication application. For example, in the case of authenticating users to a banking web site, over time various users will sign up for access to the web site such as when they become customers of the bank. Step 312 extracts features of the biometric samples to provide biometric templates. Feature extraction is optional. For example, as discussed, for fingerprints, the biometric sample can be an image which is matched to template images without extracting minutia from the image. Step 314 provides a generic database with entries of biometric templates and associated data values such as a key, a password, a global user identifier (GUIDs), or other data which is to be used in authenticating the user.

The associated data values can be randomly assigned to each user or can be based on an input from a user such as a password. Optionally, multiple associated data values can be provided for an entry. An identifier of each user can also be provided in the database.

Step 316 provides a database for a subject user by selecting an entry for the subject user and entries for other users from the generic database. For example, as mentioned in connection with FIG. 1, the database 126 can include N entries as a proper subset of the M entries of the generic database 124. The N entries include E(su), the entry for the subject user and E(1) to E(su−1) and E(su+1) to E(N), the entries for the other users. Step 316 may be performed in response to a request from a user's computing device, for instance.

Step 318 deploys the database for a subject user. For example, the database can be maintained at the server 120 but not at the user computing device 110, at the user computing device 110 but not at the server 120, or at both the server 120 and the user computing device 110. In one approach, the database is securely transmitted via the network 130 from the server 120 to the user computing device 110. In another approach, the database is provided on a portable storage device such as a USB memory stick or other portable flash memory, or a smart card (integrated circuit card) which can be read by the user computing device in connection with the authentication process. Once the database is deployed, the user can be authenticated.

FIG. 3C depicts an example client-side perspective of the authenticating process of FIG. 3A. At step 320, the computing device of a subject user obtains initial biometric data of the user. The initial biometric data represents an initial biometric sample of the user such as received by a biometric sensor and optionally subject to processing by the processing/feature extraction module 232. The initial biometric data can be provided in connection with the user enrolling or registering with the authentication application. In one approach, the initial biometric data of the user is securely transmitted via the network 130 from the user computing device 110 to the server 120 (step 322). At step 324, the computing device receives a database for the subject user from the server and stores the database. For example, the database can be received via a secure network transmission or accessed via a portable media such as a smart card. At step 326, the computing device uses the database for the subject user in a session to authenticate the subject user, as discussed further, e.g., in connection with FIG. 4D.

A method at the client side can generally include receiving a biometric sample of a user at a computing device, and comparing the biometric sample to a plurality of biometric templates in a database, where the database comprises a respective data value associated with each of the biometric templates and each respective data value in the database is unique. The method can further include, responsive to the comparing, selecting one of the biometric templates as a best match to the biometric sample, where one of the respective data values is associated with the one of the biometric templates, and authenticating the user using the one of the respective data values as one factor in the authenticating.

FIG. 3D depicts an example process for using a database for a subject user in a session to authenticate the subject user in accordance with step 326 of FIG. 3C. For example, as mentioned, a session may involve a user authenticating to a banking web site to perform a banking transaction. A user session begins at 330. For example, this may occur when a user begins a process to login to the banking web site. At 332, the user computing device receives a subsequent biometric data from user, such as via the biometric sensor. Note that different computing devices can be used to obtain the initial and subsequent biometric data. For example, the user may use a laptop to provide the initial biometric data and a cell phone to provide the subsequent biometric data. The same biometric data can be used to authenticate a user at multiple computing devices.

Step 334 compares the subsequent biometric data to the biometric templates in the database for the subject user. Optionally, as discussed, the comparison can be based on features which are extracted from the subsequent biometric sample, and features which were extracted from the initial biometric sample. Step 336 identifies a best match entry in the database for the subject user from among all of the biometric templates, as discussed further, e.g., in connection with FIG. 3E. Step 338 performs authentication of the user using a data value associated with the best match entry.

FIG. 3E depicts an example process for identifying a best match entry in a database for a subject user in accordance with step 336 of FIG. 3D. Generally, the number of biometric templates in a database can be fairly large, such as in the thousands, so that a subject user's biometric template is sufficiently randomized to a desired degree in the database. For example, with N=10,000 biometric templates of other users in a database with a subject user's biometric template, the degree of randomization is 1 in 10,000. The number of entries is reasonably large to provide the desired degree of randomness for a given entry, but can be smaller than a key space of the data values to avoid the database becoming excessively large. For example, a data value can comprises an n1-bit key (e.g., n1=160 bits), where the number (N) of the biometric templates in the database is less than $2^{n1}$, a key space of the n1-bit key. The respective data values other than the respective data value for the subject user in the database are not used in the authenticating of the subject user but provide a desired degree of randomness for the respective data value of the subject user in the database.

The processing resources for performing comparisons with each of the biometric templates can be significant. An optimum tradeoff can be made between the processing burden and the desired degree of randomization. Moreover, parallel processing approaches can be used, where comparisons between the subsequent biometric data and multiple biometric templates are performed in parallel, such as by using processing resources of one or more computing devices in parallel. For example, a parallel processing technique such as map and reduce can be used where different computing devices perform comparisons for different subsets of the biometric templates. Further, the comparisons can be made at one or more user computing devices, one or more processors of a single user computing devices and/or at one or more servers. If the comparisons are made at one or more servers which maintain the database of biometric templates, the user computing device can transmit the subsequent biometric data to the one or more servers. In a serial processing approach, comparisons between the subsequent biometric data and the biometric templates can be performed one biometric template at a time.

Step 340 compares the subsequent biometric data to a biometric template of an entry in the database for the subject user. Step 342 provides a score indicating a degree of matching. Decision step 344 determines if there is a next entry to process in the database. If there is, steps 340 and 342 are repeated for the next entry. If the last entry has been processed, step 346 selects the entry with the highest score, indicating the closest match. Decision step 348 may be used to determine if the highest score exceeds a minimum score. If decision step 348 is false, the process is aborted at step 350. This might occur if the biometric sample is of poor quality, for instance. If decision step 348 is true, step 352 obtains the data value associated with the entry with the highest score, e.g., DV(su), in the database 126 of FIG. 1. For example, the authentication application can read in the data value from the database.

In a simplified example of the database 126, N=10,000 biometric templates and the data values DV(1) to DV(N) are the four digit values 0001-9999, respectively. All of the biometric templates can be randomly chosen, except one of them will be the user's biometric template. When the user tries to authenticate with his or her biometric sample, it is matched against the 10,000 entries to provide the four digit number that is associated with the closest match. However, the numbers or other data values need not be sequential and can be random values from a large domain.

FIG. 4A-4D depict example processes for performing authentication using the data value of a best match entry in accordance with step 338 of FIG. 3D. Various approaches can be used to authenticate a user based on the data value of the best match entry of the database.

Figure 4A:
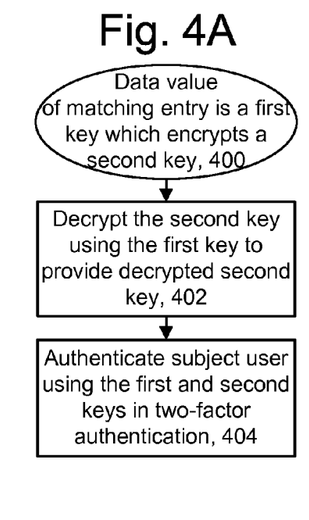
FIG. 4A-4F depict example processes for performing authentication using the data value of a best match entry in accordance with step 338 of FIG. 3D.
Figure 5:
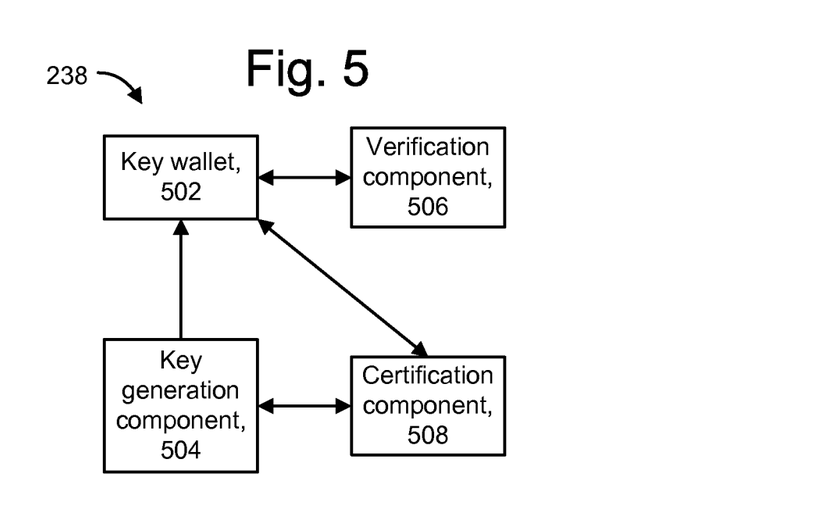
FIG. 5 depicts example software modules which can be part of the authentication application 238 of FIG. 2B and used in connection with an authentication process such as described in FIG. 4G.

In the approach of FIG. 4A, the data value of the matching entry is a first key which encrypts a second key (item 400). Thus, the second key is encrypted under, or protected by, the first key. In one approach, the second key is randomly selected by a server and associated with the subject user. The computing device can be configured with the encrypted key in the registration process of the authentication application, for instance. The encrypted key can be stored at the computing device at a location which is known to the authentication application such as in a key wallet (FIG. 5). The encrypted key can be transmitted from the server to the computing device via a network or stored on a portable media such as a smart card which the user provides to the computing device, for instance.

In one possible implementation, step 402 decrypts the encrypted second key using the first key to provide a decrypted key. See FIG. 6, for instance. Step 404 authenticates the subject user using the first and second keys in two-factor authentication. One factor is the first key, which represents "something a person is" since it is a cryptographic key obtained using a biometric of the user. Another factor is the second key, which represents "something the person possesses" since it is stored in the computing device or portable media, for instance, which the user possesses.

Figure 4B:
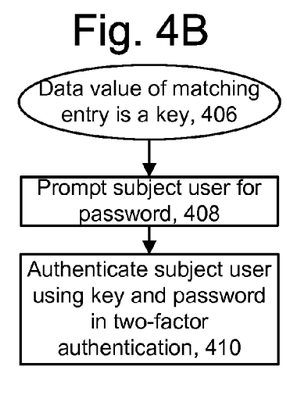

In the approach of FIG. 4B, the data value of the matching entry is a key (item 406). Step 408 prompts the subject user for a password and step 410 authenticates the subject user using the key and the password in two-factor authentication. One factor is the key, which represents "something a person is," as discussed. Another factor is the password, which represents "something the person knows," such as a memorized password or PIN.

Figure 4C:
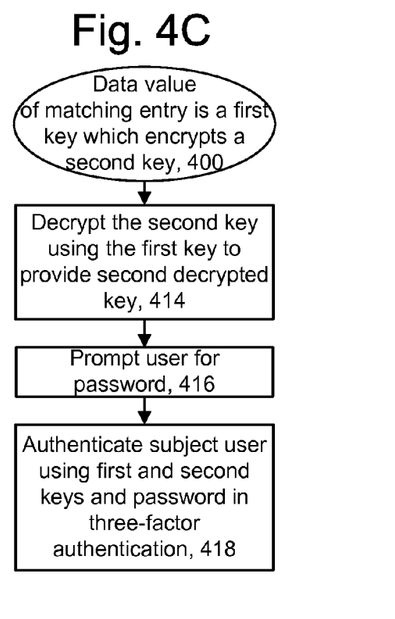

In the approach of FIG. 4C, the data value of the matching entry is a first key which encrypts a second key (item 412). Step 414 decrypts the second key using the first key a decrypted key. Step 416 prompts the subject user for a password and step 418 authenticates the subject user using the first and second keys and the password in three-factor authentication. One factor is the first key, which represents "something a person is." Another factor is the second key, which represents "something the person possesses." A further factor is the password, which represents "something the person knows."

Figure 4D:
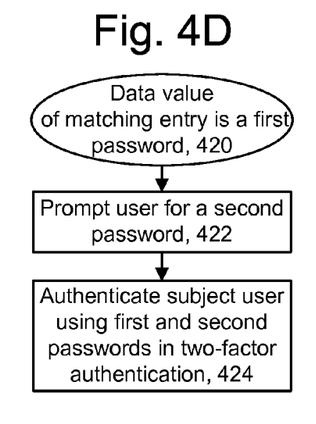

In the approach of FIG. 4D, the data value of the matching entry is a first password (item 420) which the user has provided, such as in a registration process of the authentication application. Step 422 prompts the subject user for a second password and step 424 authenticates the subject user using the first and second passwords in a two-factor authentication. One factor is the first password, which represents "something a person is." Another factor is the second password, which represents "something the person knows."

Figure 4E:
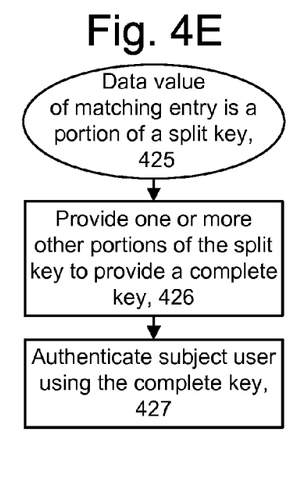

In the approach of FIG. 4E, the data value of the matching entry is a portion or share of a split key (item 425). Step 426 provides one or more other portions of the split key to provide a complete key. Generally, a key can be split or shared among n>1 people in such a way that more than one or two people must present a piece of the key in order to reconstitute it to a usable condition. If too few pieces of the key are available, then the key is unusable. Some examples are to split a key into three pieces and require two of them to reconstitute the key, or split it into two pieces and require both pieces. Step 427 authenticates the subject user using the complete key. This can be a joint authentication of the multiple users. The portion of the split key can be a portion of a key, password, access code or other data. The portion of the split key represents "something a person is" and is one factor in the authentication. Additional factors can be added as well.

Figure 4F:
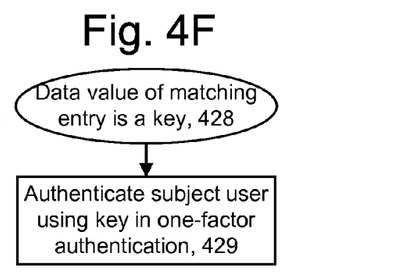

In the approach of FIG. 4F, the data value of the matching entry is a key (item 428). Step 429 authenticates the subject user using the key in one-factor authentication. The one factor is the key, which represents "something a person is."

Figure 4G:
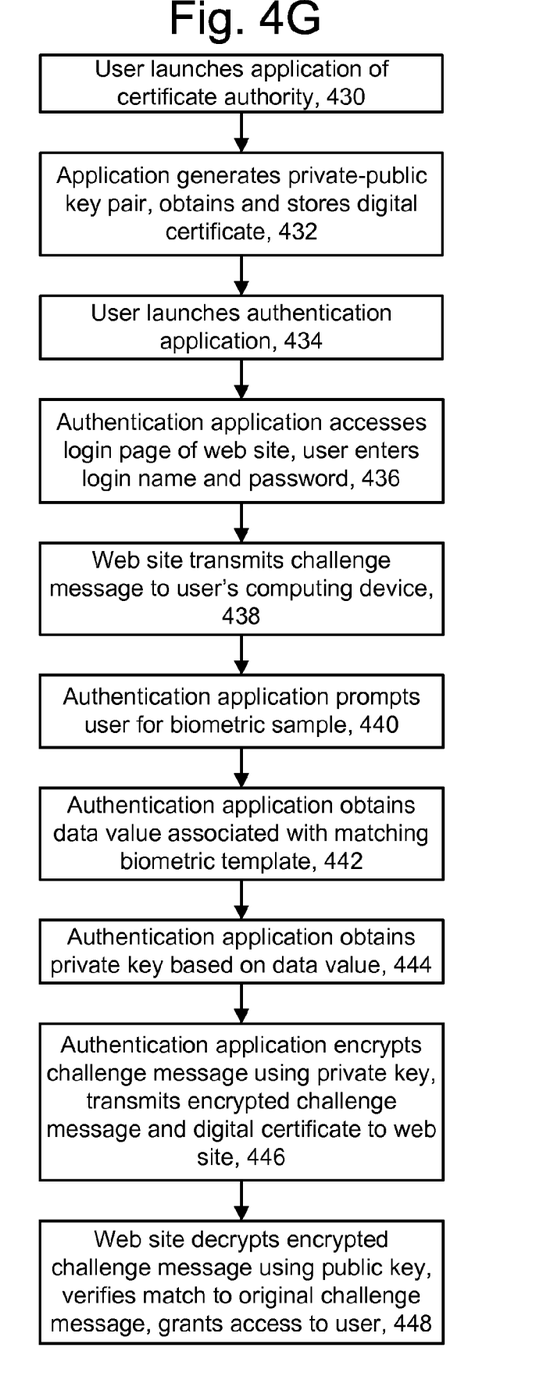
FIG. 4G depicts an example process in which a user is authenticated by an application to access a web site.

FIG. 4G depicts an example process in which a user is authenticated by an application to access a web site. Generally, as described in FIG. 4A-4D, the authentication of a user can involve using one or more of: the data value of the matching entry, a key which is protected by the data value of the matching entry, and any additional information provided by the user such as a password.

An example implementation of an authentication algorithm uses a public-key cryptography system. This system uses two separate keys: one is secret or private and the other is public. The two keys are mathematically linked such that one key encrypts plaintext to provide ciphertext and the other key decrypts the ciphertext back to the plaintext. Further, a public key infrastructure can be used which includes a certificate authority to certify ownership of a key pair by a user. The certificate authority issues a digital certificate which includes the public key and identification information of the user (e.g., the name of a person, organization, server or other entity). The digital certificate is signed by the certificate authority. The private key can be stored in a software key container (digital wallet) which is resistant to attacks.

An example process of such an authentication algorithm is provided in FIG. 4G. The user launches an application of a certificate authority on a computing device (step 430). The application of the certificate authority generates a private-public key pair, and obtains and stores a digital certificate (step 432). Steps 430 and 432 can occur separately, or together with, the remaining steps.

Subsequently, the user launches the authentication application on a computing device (step 434). The authentication application accesses a login page on a web site hosted by a server, where the user enters a login name and password (step 436). In this example, assume the user attempts to access a banking web site. Once this information is verified, the web site transmits a challenge message to the user's computing device, such as a time-stamped random string of characters (step 438). In response to the challenge message, the authentication application prompts the user to provide a biometric sample (step 440). In response to the biometric sample, the application obtains the data value associated with the matching biometric template (step 442). The authentication application is then ready to respond to the challenge message. The authentication application obtains the private key based on the data value (step 444). For example, the private key can be encrypted under the data value and optionally also under additional information such as a password, or the private key can be the data value or directly derivable from the data value without using a cryptographic process, for instance.

The authentication application encrypts (signs) the challenge message using the private key and transmits the encrypted challenge message and the digital certificate to the web site (step 446). The web site decrypts the encrypted challenge message using the user's public key contained in the digital certificate, verifies that the decrypted challenge message matches the original challenge message sent to the authentication application at step 438, and grants access to the web site by the user (step 448). The steps shown can occur in a different sequence. For example, the authentication application can prompt the user for the biometric sample before the authentication application accesses the login page of the web site.

FIG. 5 depicts example software modules which can be part of the authentication application 238 of FIG. 2B and used in connection with an authentication process such as described in FIG. 4G. The modules include a key generation component 504, a key wallet 502, a verification component 506 and a certification component 130.

The key generation component 504 creates the public and private keys for the user at a set-up time, when the user creates his or her credentials.

The key wallet 502 stores the private key and is used to create a digital signature. In one approach, the private key is camouflaged by embedding it in a multitude of apparently similar keys, such as described in U.S. Pat. No. 6,170,058, titled "Method and apparatus for cryptographically camouflaged cryptographic key storage, certification and use," incorporated herein by reference. The key wallet provides the embedding for the cryptographic camouflaging as described further in connection with FIG. 6. The key wallet can be a software-based lockbox containing the user's private key, where the lockbox can only be unlocked by a certain access code such as a secret PIN that is known only to the legitimate user. In a modification of the technique of U.S. Pat. No. 6,170,058, the access code can be a data value such as the data value of the matching biometric template in a database, or a key, PIN or other data which is protected by such a data value.

The verification component 506 is used to verify a signature created by the key wallet. As mentioned, the authentication application encrypts (signs) a challenge message using the private key. The verification component can receive the certificate containing the public key in encrypted form, use the private key to decrypt the public key and then use the public key to verify the digital signature.

The certification component 508 is used to create a public key certificate which certifies the public key created by the key generation component.

Figure 6:
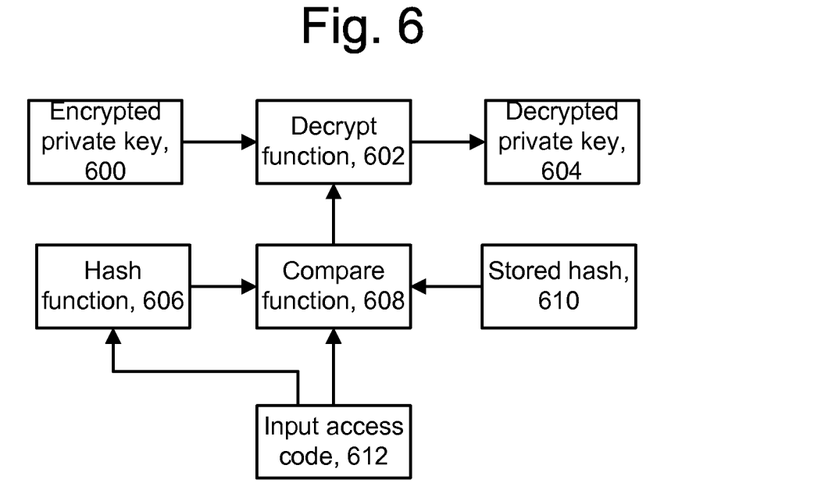
FIG. 6 provides example software components of the key wallet 502 of FIG. 5.

FIG. 6 provides example software components of the key wallet 502 of FIG. 5. An input access code 612 is provided to a hash function 606 and a compare function 608. For example, the access code can be a data value of a matching biometric template or a key protected by such a data value. The access code is entered to unlock the digital wallet to obtain the private key. In one approach, the hash function 606 is a 1:1 hash function, such that only one access code produces the correct hashed output. The hashed value of the access code is compared with a stored hash value 610, which is the hashed value of the correct access code, at a compare function 608. If the two hash values agree, the compare function 608 passes the input access code 612 to a decryption function 602. The length of the hashed value can be the same as or different than the length of the access code. The private key 600, which is encrypted using the access code as the encryption key, is decrypted by the decryption function using the access code. The decrypt function can use DES or some other cryptographic function. The decrypted private key 604 is then released for use, such as to encrypt a challenge message as discussed in connection with step 446 of FIG. 4G.

However, the key wallet is subject to an access code hash attack when a 1:1 hash function is used. To overcome this problem, an N:1 hash function can be used in which many inputs produce the same hashed output. For example, a many-to-one hash function could hash a six-digit access code to a two-digit hash value. The compare function 608 compares the hashed value from the hash function 606 to a stored hash value. If the two hash values match, the candidate access code is passed to the decrypt function to decrypt the encrypted private key. Since the hash function is many-to-one, there will be many different hashed access codes that match the stored hash value, and the compare function can pass any of them to the decrypt function. For example, if the hash function hashes six-digit access codes to two-digit hash values, there will be 10,000 six-digit access codes that can be passed, out of a total of 1,000,000 possible six-digit codes. However, a large majority of the possible hashed access codes will not match the stored hash value.

Even though a substantial number of candidate decrypted private keys (represented by private key 604) can be produced, all but one will be incorrect. That is, the incorrect access codes will result in incorrect decryptions of the encrypted private key. An incorrect private key will result in the user not being successfully authenticated. For example, in the process of FIG. 4G, the incorrect private key will result in a failed response to the encrypted challenge message. This serves to reveal an attacker, who expects the decrypted private key to be correct. In contrast, the approach using a 1:1 hash function would block any decryption of the encrypted private key when an incorrect access code is provided, in which case the attacker would not be revealed. The one correct access code will result in a correct decryption of the encrypted private key and the user being successfully authenticated. The private key is considered to be a camouflaged private key in this example.

The private key referred to in the context of a public-key cryptography system can alternatively be a key in a symmetric-key algorithm which uses the same cryptographic keys for both encryption of plaintext and decryption of ciphertext. The keys may be identical or there may be a simple transformation between the two keys.

By providing the access code using a data value which is tied to a biometric of a user, the key wallet is made more secure because it is based on "something a person is." Further, the access code can also be based on other data such as a password or PIN, for instance, which represent "something the person knows." For example, the access code can be obtaining by combining the data value which is linked to the user's biometric with a password entered by the user, e.g., by encrypting one with the other or otherwise cryptographically combining the two.

Accordingly, it can be seen that techniques are provided for consistently and reliably mapping a biometric of a user to a unique number or other data value to allow the user to use a biometric credential to access a protected resource. For example, the biometric credential can provide an access code which is used to access a camouflaged private key. In one approach, two-factor authentication is used based on (1) the data value provided by the biometric credential and the (2) private key. This can avoid the need for the user to enter a password, for instance, so that the authentication process becomes easier.

Or, the camouflaged private key can be used in a three-factor authentication method, e.g., using (1) a password provided by the user, (2) the data value provided by the biometric credential and the (3) private key. Moreover, once the data value provided by the biometric credential has been retrieved from a database, the biometric credential can be kept safe and is no longer needed in the authentication process.

In contrast, another approach is to attempt to derive a data value based on characteristics of a biometric sample. However, such an approach does not reliably map the biometric sample to a data value due to variations in the quality of a biometric credential which is obtained in real-world conditions.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method, comprising:
enrolling an initial biometric sample of a user with an authentication application at a server;
receiving a user-specific database from the server and storing the user-specific database at a computing device of the user, the user-specific database is created specifically for the user in response to the enrolling and comprises biometric templates for a number N users, including biometric templates of other users and a biometric template of the user which is based on the initial biometric sample of the user, wherein the biometric template of the user is randomly positioned within the user-specific database, and the user-specific database is created in response to the enrolling as a proper subset of biometric templates of a number M users in a generic database, where N is less than M, and the user-specific database comprises a respective data value associated with each of the biometric templates for the N users, and each respective data value in the user-specific database is unique;
after the enrolling, receiving a subsequent biometric sample of a user at the computing device;
comparing the subsequent biometric sample to a plurality of biometric templates among the biometric templates in the user-specific database;
responsive to the comparing, selecting one of the biometric templates in the user-specific database as a best match to the subsequent biometric sample, one of the respective data values is associated with the one of the biometric templates; and
authenticating the user using the one of the respective data values as one factor.

2. The method of claim 1, wherein:
the authenticating of the user occurs without the subsequent biometric sample being transmitted outside the computing device.

3. The method of claim 1, wherein:
the one of the respective data values comprises a password.

4. The method of claim 1, further comprising:
accessing a private key, the private key is encrypted using a password;
prompting the user to input the password;
using the password as another factor in the authenticating of the user;

decrypting the private key using the password to provide a decrypted private key; and
using the decrypted private key as a further factor in the authenticating of the user.
5. The method of claim 1, further comprising:
accessing a private key, the private key is encrypted using the one of the respective data values;
decrypting the private key using the one of the respective data values to provide a decrypted private key; and
using the decrypted private key as another factor in the authenticating of the user.
6. The method of claim 5, further comprising:
prompting the user to input a password; and
using the password as a further factor in the authenticating of the user.
7. The method of claim 5, wherein:
the private key comprises a camouflaged private key.
8. The method of claim 1, wherein:
the one of the respective data values comprises an n1-bit key; and
the number N of the biometric templates in the database is less than $2^{n1}$, a key space of the n1-bit key.
9. The method of claim 1, wherein:
the one of the respective data values comprises a portion of a split key.
10. The method of claim 1, wherein:
the authenticating uses the one of the respective data values as a key.
11. The method of claim 1, wherein:
the biometric templates of the other users are randomly selected from among the biometric templates of the M users in the generic database.
12. The method of claim 1, wherein:
the biometric templates of the other users comprise consecutive biometric templates among the M users in the generic database.
13. A system, comprising:
a storage device; and
a processor in communication with said storage device, the processor programmed to:
  obtain initial biometric data from a user;
  transmit the initial biometric data to a server, the server associating a data value with the initial biometric data;
  receive from the server a database comprising the initial biometric data of the user and the associated data value of the initial biometric data, and biometric data and associated data values of thousands of other users, wherein the database is specific to the user, the initial biometric data of the user is randomly positioned within the biometric data of the thousands of other users, and the biometric data of the thousands of other users is randomly selected as a proper subset of biometric data of users in a generic database;
  store the database in the storage device;
  receive subsequent biometric data of the user;
  perform a comparison of the subsequent biometric data of the user to the initial biometric data of the user and to the biometric data of the other users to determine that the initial biometric data of the user is a closest match to the subsequent biometric data of the user; and
  responsive to the comparison, use the associated data value of the initial biometric data to perform authentication of the user.

14. The system of claim 13, wherein the processor is programmed to:
responsive to the comparison, use the associated data value of the initial biometric data as one factor in the authentication of the user.
15. The system of claim 14, wherein the processor is programmed to:
use the associated data value of the initial biometric data to decrypt an encrypted key to provide a decrypted key; and
use the decrypted key in the authentication.
16. A system, comprising:
a storage device; and
a processor in communication with the storage device, the processor programmed to:
  receive biometric data from computing devices of a plurality of users as the plurality of users enroll with an authentication application;
  provide a generic database with entries for each of the plurality of users, each entry comprising the biometric data and an associated data value of the user;
  receive a request from one of the computing devices, the one of the computing devices is associated with a subject user;
  in response to the request, randomly select a proper subset of the entries, the proper subset of the entries comprising an entry of biometric data and associated data value for the subject user, and entries of biometric data and associated data values for other users of the plurality of users, and provide a user-specific database for the one of the computing devices of the subject user comprising the proper subset of the entries;
  receive subsequent biometric data from the one of the computing devices;
  compare the subsequent biometric data to biometric data of a plurality of entries among the proper subset of the entries in the user-specific database;
  responsive to the compare, select one of the entries in the user-specific database as a best match to the subsequent biometric data, one of the associated data values is associated with the one of the entries; and
  authenticate the user using the associated data values.
17. The system of claim 16, wherein:
the associated data value of the entry for the subject user comprises an n1-bit key; and
a number of biometric templates in the user-specific database is less than $2^{n1}$, a key space of the n1-bit key.
18. The system of claim 16, wherein the processor is programmed to:
deploy the user-specific database for the computing device of the subject user on the computing device of the subject user.
19. The system of claim 16, wherein:
the associated data value comprises a key which is used in an authentication process at the computing device of the subject user.
20. The system of claim 16, wherein:
the associated data value comprises a password which is used in an authentication process at the computing device for the subject user.

* * * * *